May 13, 1930. G. J. SCHMIDT 1,758,471
VALVE
Filed Sept. 4, 1928
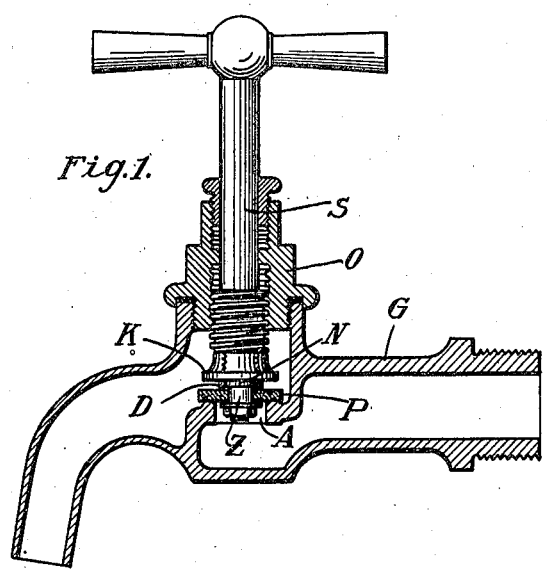
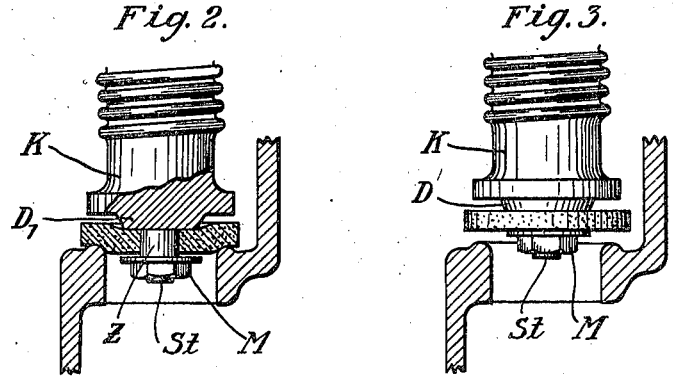
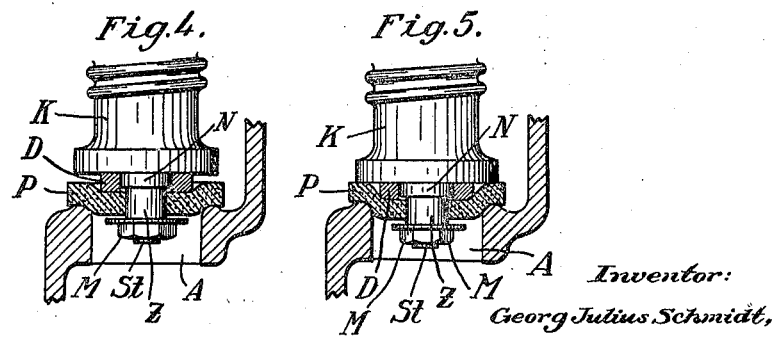
Inventor:
Georg Julius Schmidt,
Att'y.

Patented May 13, 1930

1,758,471

UNITED STATES PATENT OFFICE

GEORG JULIUS SCHMIDT, OF ZWEIBRUCKEN, GERMANY

VALVE

Application filed September 4, 1928, Serial No. 303,746, and in Germany February 12, 1926.

This invention relates to improvements in valves, cocks, faucets, taps and the like, and more especially to an improved device of this kind in which a yielding packing or tightening disc is used intermediate the valve and the valve-seat.

My invention has for its primary object to improve the construction of devices of the aforementioned kind by providing in addition to the said yielding packing or tightening disc an additional preferably rigid pressure-disc of annular or circular conformation, said additional disc having an outer diameter which is smaller than the diameter of the aperture of the valve-seat which aperture serves as the passage-way for the valve. In this manner the said yielding packing or tightening disc during closing of the valve will first be somewhat depressed and forced with its centrally positioned parts into the valve-aperture and subsequently thereto firmly pressed along a ring-shaped surface against the face of the valve-seat.

In the accompanying drawing I have shown and in the following specification described in detail a preferred construction of a valve, cock, faucet or tap according to my invention. In the drawing Fig. 1 is a longitudinal section through the new faucet or cock showing the main operating members in view, Fig. 2 an enlarged fractional view and section of the main operating members of the device shown in Fig. 1 comprising a somewhat modified construction of the rigid pressure-disc, said operating members being shown in preliminarily closed condition, Fig. 3 an enlarged view and section similar to Fig. 2 showing the faucet or cock of Fig. 1 in fully open condition, Fig. 4 an enlarged view, partly in section, of the main operating members of the device shown in Fig. 1 when in preliminarily closed condition, and Fig. 5 a section and view similar to Fig. 4 showing the main operating members in fully closed condition.

Referring now more particularly to the drawing, the casing G of the cock or faucet as shown in Fig. 1 is of the ordinary construction, said casing G carrying a head-piece O which serves for receiving and guiding the valve-spindle S having a threaded lower end engaging with a central thread in said head-piece O, while the upper end of said valve-spindle terminates in a T-handle, as shown in Fig. 1. To the threaded lower end of the valve-spindle S there is fixed the valve-disc, valve-head or closing member proper K which according to Figs. 1, 4 and 5 is provided with a centrally positioned guide-neck for the rigid annular pressure-disc D and a further guide-neck Z of reduced diameter for the yielding packing-disc P which is likewise of annular conformation. The rigid annular pressure-disc D carried by the guide-neck N will thus be positioned above the packing-disc P carried by the guide-neck Z. The outer diameter of the pressure-disc D is somewhat smaller than the diameter of the aperture A which serves as a passageway for the valve or similar device. Below the guide-neck Z there is provided a threaded stud St carrying a nut M as well as a washer W interposed between said nut M and said guide-neck Z for keeping the packing-disc P in proper position. The packing-disc P is of a thickness permitting some play intermediate the under surface of the pressure-disc D and the washer W. When closing the valve by rotating the valve-spindle S, the packing-disc P will first come into preliminary contact with the valve-seat and thereupon be forced into the aperture A by action of the pressure-disc D which will cause said packing-disc to be brought more closely into contact with the face of the valve-seat and especially with the adjoining conical edge of the aperture A as indicated in Fig. 4. Upon continued rotation of the valve-spindle S the packing-disc P will now still further be forced onto the valve-seat and the adjoining conical edge of the aperture A and finally assume a position as indicated in Fig. 5. In this position the valve will be fully closed. It may be noted that in fully closed position of the valve, as shown in Fig. 5, a double tightening will take place, viz: the packing-disc P, owing to the depression produced therein at its central parts by action of the pressure-disc D will in the first place be forced into the conical part and the aperture A of the valve-seat and in the second place the outer parts of the packing ring P will be pressed flat against the face of the valve-seat by action of the valve-disc K. A very perfect closing and tightening of the valve may thus be secured owing to the aforedescribed double tightening due to the combined action of the pressure-disc D and the valve-disc K.

In the modified form of valve shown in Fig. 2 the pressure-disc $D_1$, which according to Figs. 1, 4 and 5 consists of a separate member, is made integral with the valve-disc K. In this case the guide-neck N is omitted and the pressure-disc is made of circular form as a part $D_1$ integral with the valve-disc K.

It will be observed that with the construction according to Fig. 2 the same effect may be obtained as with the construction shown in Figs. 1, 4 and 5, the essential feature common to both constructions being the provision of a pressure-disc D or $D_1$ on the valve-disc K, said pressure-disc in either mode of construction being of an outer diameter which is smaller than the diameter of the aperture A, so that the packing-disc P during closing of the valve will first be forced into the aperture A and thereupon pressed against the valve-seat.

I claim:

1. In a valve of the character described, the combination of a valve-disc, a valve-seat surrounding an aperture, a packing-disc interposed between said valve-disc and said valve-seat, and means between said valve-disc and said packing-disc for forcing said packing-disc during closing of the valve into said aperture and subsequently thereto pressing said packing-disc tightly against said valve-seat.

2. In a valve of the character described, the combination of a valve-disc, a valve-seat surrounding an aperture, a pressure-disc below said valve-disc of less diameter than said aperture, and a packing-disc interposed between said valve-disc and pressure-disc and said valve-seat and aperture, said packing-disc being of an outer diameter larger than the diameter of said aperture, whereby during closing of the valve said packing-disc will first be forced into said aperture and subsequently thereto pressed tightly against said valve-seat.

3. In a valve of the character described, the combination of a valve-seat and aperture therein, a valve-closing member, said valve-closing member consisting of a valve-disc, a neck projecting centrally from said valve-disc, a pressure-disc carried on said neck and a packing-disc interposed between said pressure-disc and said valve-seat, the outer diameter of said pressure-disc being smaller and the diameter of said valve-disc larger than the diameter of said aperture, whereby during closing motion of the valve said packing-disc will first be forced into said aperture by action of said pressure-disc and thereupon pressed tightly against said valve-seat by action of said valve-disc.

4. In a valve of the character described, the combination of a valve-seat surrounding an aperture, a conical surface between said valve-seat and said aperture, a valve-closing member consisting of a valve-disc of a diameter to fit the face of said valve-seat, and a pressure-disc in contact with said valve-disc, said pressure-disc being of an outer diameter which is smaller than the diameter of said aperture, a packing-disc interposed between said valve-disc and pressure-disc and said valve-seat, and a threaded spindle associated with said valve-disc for pressing said valve closing member against said valve-seat with said pressure-disc and said packing-disc interposed between same and the valve-disc, whereby said packing-disc during closing of the valve will first be forced into said aperture by action of said pressure-disc and subsequently thereto pressed tightly against said valve-seat by action of said valve-disc.

5. In a valve of the character described, the combination of a valve-seat surrounding an aperture and a conical edge between said valve-seat and said aperture, a valve-closing member consisting of a valve-disc of a diameter to fit the face of said valve-seat, a guide-neck on said valve-disc centrally thereto, a pressure-disc carried by said guide-neck, said pressure-disc being of a diameter smaller than that of said aperture, a second guide-neck of reduced diameter on said former guide-neck, a packing-disc carried by said second guide-neck, and a nut and washer for keeping said packing-disc in position on its guide neck, a threaded spindle carrying said valve-closing member for pressing the latter against said valve-seat with said packing-disc and said pressure-disc interposed between same and the valve-disc, so as to first force said packing-disc into said aperture by action of said pressure-disc and thereupon pressing said packing-disc against the face of said valve-seat by action of said valve-disc, whereby said packing-disc in fully closed position of the valve will come in intimate contact with said conical edge between said valve-seat and said aperture as well as with the face of said valve-seat.

In testimony whereof I affix my signature.

GEORG JUL. SCHMIDT.